United States Patent [19]

Pfeifer et al.

[11] Patent Number: 4,909,564

[45] Date of Patent: Mar. 20, 1990

[54] FRONT LOADING REFUSE TRUCK BODY

[75] Inventors: Thomas E. Pfeifer, Galion; Larry D. Horning, Crestline, both of Ohio

[73] Assignee: Peabody International Corporation, Princeton, N.J.

[21] Appl. No.: 188,212

[22] Filed: Apr. 29, 1988

[51] Int. Cl.⁴ .................... B60P 1/00

[52] U.S. Cl. .................... 296/184; 296/183

[58] Field of Search .................... 296/183, 184; 414/492, 414/512, 513

[56] References Cited

U.S. PATENT DOCUMENTS

| | | | |
|---|---|---|---|
| D. 198,839 | 8/1964 | Herpich et al. . | |
| D. 198,840 | 8/1964 | Herpich et al. . | |
| D. 257,766 | 1/1981 | Smith . | |
| 825,611 | 7/1906 | Ostrander . | |
| 1,948,137 | 2/1934 | Simonds | 220/71 |
| 2,316,296 | 4/1943 | Simonds | 220/72 |
| 2,477,831 | 8/1949 | Schmitz, Jr. | 229/1 |
| 2,490,532 | 12/1949 | Maxon | 296/184 |
| 2,868,398 | 1/1959 | Anderson et al. | 214/82 |
| 2,952,922 | 9/1960 | Wenzl | 34/92 |
| 2,996,202 | 8/1961 | Neyland | 214/82 |
| 3,043,599 | 7/1962 | Meyer | 280/5 |
| 3,064,835 | 11/1962 | Aldredge | 214/82 |
| 3,139,286 | 6/1964 | Johnson | 280/5 |
| 3,207,336 | 9/1965 | Boeck et al. | 214/82 |
| 3,339,499 | 9/1967 | Charles et al. | 105/248 |
| 3,427,994 | 2/1969 | Keene | 105/248 |
| 3,490,387 | 1/1970 | Halcomb | 105/248 |
| 3,495,548 | 2/1970 | Rollins | 105/248 |
| 3,540,115 | 11/1970 | Geyer et al. | 29/421 |
| 3,543,692 | 12/1970 | Stark et al. | 105/248 |
| 3,583,330 | 6/1971 | Freudman et al. | 105/239 |
| 3,583,331 | 6/1971 | Mowatt-Larssen | 105/360 |
| 3,661,293 | 5/1972 | Gerhard et al. | 220/71 |
| 3,776,144 | 12/1973 | Eislers | 105/406 |
| 3,817,189 | 6/1974 | Bailey et al. | 105/406 |
| 3,841,236 | 10/1974 | Hammonds et al. | 105/364 |
| 3,883,148 | 5/1975 | Miller | 280/5 |
| 4,335,991 | 6/1982 | Sweet et al. . | |
| 4,353,312 | 10/1982 | Brouwer | 105/241.2 |
| 4,378,190 | 3/1983 | Smith | 414/525 R |
| 4,484,528 | 11/1984 | Anderson et al. | 105/248 |
| 4,598,646 | 7/1986 | Dugge et al. | 105/248 |
| 4,691,959 | 9/1987 | Verner | 296/184 |
| 4,715,767 | 12/1987 | Edelhoff et al. | 414/408 |

FOREIGN PATENT DOCUMENTS

| | | | |
|---|---|---|---|
| 1085866 | 4/1984 | U.S.S.R. | 296/184 |

OTHER PUBLICATIONS

Peabody Galion Hercules front loader sales brochure.
Truxmore 6 sales brochure.
Truxmore 10 sales brochure.
Truxmore 15 sales brochure.
Truxmore 18 sales brochure.
Truxmore 23 sales brochure.
Truxmore 27 sales brochure.
Pak—Mor FRHC800 front loader sales brochure.
Pak—Mor H—Model side loader sales brochure.
Amrep Inc. octagonal body front loading refuse truck body sales brochure.
Maxon Legal One front loader sale brochure.
The Heil Co. Half—Pack front loader sales brochure.

*Primary Examiner*—Sherman D. Basinger
*Assistant Examiner*—Stephen P. Avila
*Attorney, Agent, or Firm*—Eric M. Lee

[57] ABSTRACT

A front loading refuse collection apparatus has a body with a rear area for storing refuse, and a front hopper section for receiving refuse. The storage area has a curved roof, a curved floor and curved sidewalls. The hooper has a top opening, a curve floor and curved sidewalls. The curved sidewalls of the hopper have a smaller radius of curvature than the curved sidewalls of the storage area. The curved sidewalls of the hopper also are not symmetrical about a horizontal axis. In this way, the sidewalls of the hopper do not interfere with the operation of the loading arms and do not unnecessarily restrict the opening at the top of the hopper. The curved roof, curved floor and curved sidewalls are made from an aluminum alloy making the front loading refuse collection apparatus lightweight.

29 Claims, 4 Drawing Sheets

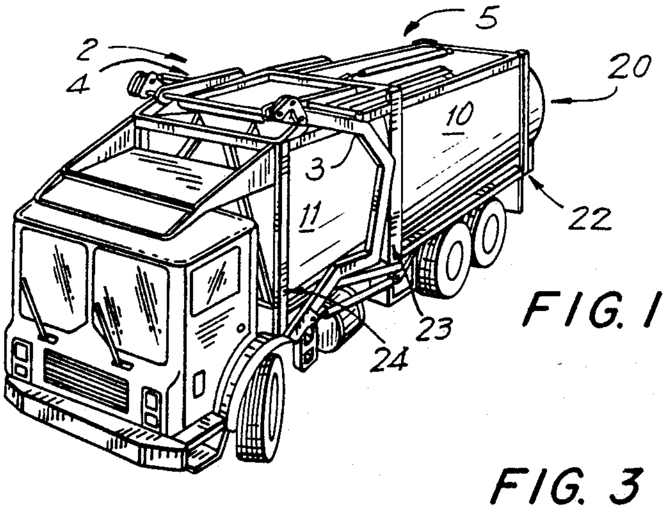
FIG. 1
FIG. 3
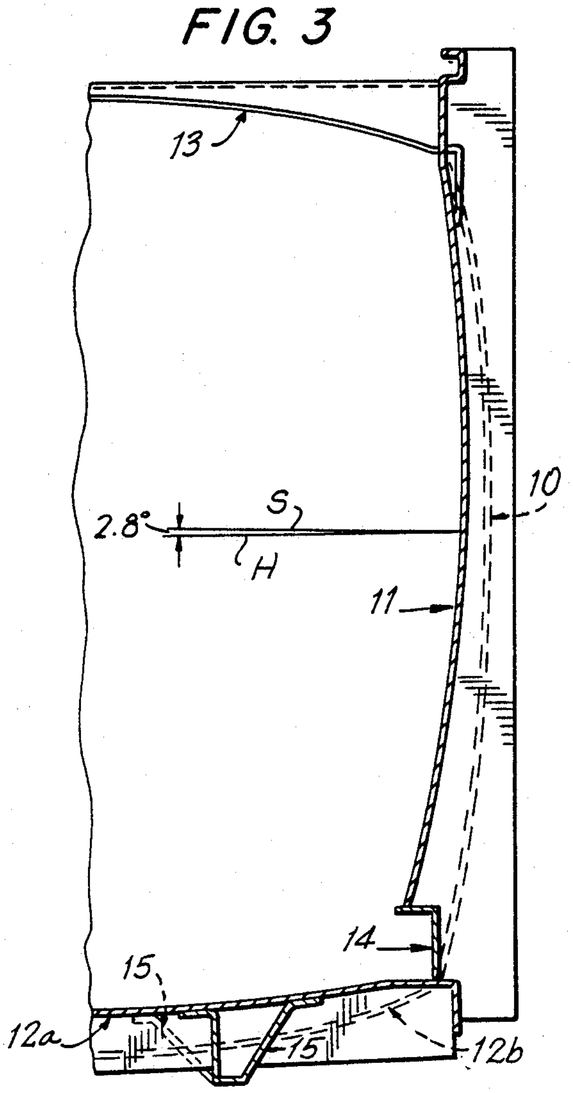

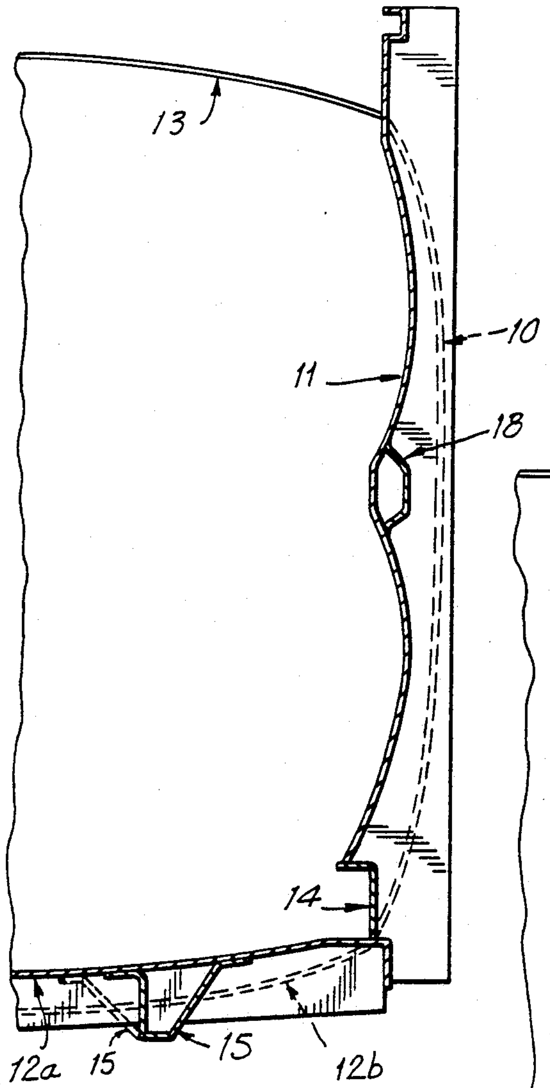
FIG. 5
FIG. 6
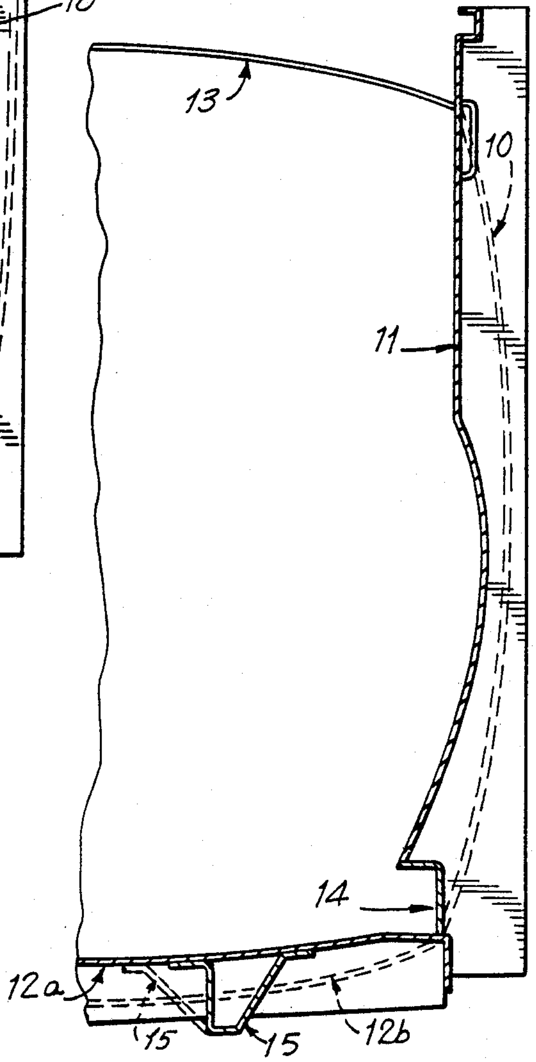

FRONT LOADING REFUSE TRUCK BODY

BACKGROUND OF THE INVENTION

This invention relates to the body of a front loading refuse truck, i.e., a front loader. More particularly, this invention relates to a front loader body that has fewer parts, requires fewer welds during assembly and is therefore easier to manufacture and is less costly. Even more particularly, this invention relates to the shape and orientation of the sidewalls of the front loader body which ensure that the sidewalls will not interfere with the operation of the loading arms and which results in a front loader that is strong yet lightweight.

Front loaders are well-known conventional refuse equipment. In a front loader, refuse from garbage containers is deposited into the front loader body for compaction and transportation to a dump site. The refuse is deposited into the hopper portion of the front loader, which is the front portion of the body, via an opening in the top of the front portion of the body. Mechanical loading arms are pivotally attached on either side of the body near the front of the unit. Forks on the forward end of the loading arms engage the garbage containers and the loading arms pivot about their point of attachment In this manner, the loading arms position the garbage containers over the opening and the forks rotate to tip the garbage containers to discharge the refuse into the front loader. After the refuse has been emptied from the garbage containers, the forks rotate the containers to an upright position and then the loading arms swing down and place the garbage containers back on the ground. After the refuse is deposited into the hopper, a packer panel packs the refuse into the storage area of the front loader body, which is the rear section of the front loader.

This loading and packing process is repeated at various points along a garbage collection route. As more and more refuse is loaded and packed into the storage area, the refuse exerts pressure against the floor, roof and sidewalls of the front loader body. When the body is completely filled with refuse, the front loader travels to a dump site to empty the refuse from the body.

In order to operate most efficiently, the front loader should be able to pack a large quantity of refuse into its body. In this way, the front loader will spend more time collecting refuse along a collection route and will spend a minimal amount of time traveling to and from a dump site.

State and federal laws strictly limit the height, length and width of all trucks. These limitations also apply to front loaders. The length of a front loader is also limited by the practical problem of maneuverability on city streets and alleys. Thus the maximum dimensions of the front loader are determined. A more efficient front loader will be able to pack large quantities of refuse into the defined volume of the front loader body. Therefore, the front loader body must be strong in order to withstand the high pressures exerted on it by the large quantities of refuse that must be packed into the front loader.

State and federal laws also strictly limit the weight of all trucks. Therefore, the total weight of a front loader packed with refuse must not exceed a certain maximum legal limit. An efficient front loader will have a body that is both strong and lightweight.

One means of decreasing the weight of the body is to make the body out of a strong and light material such as an aluminum alloy. Such an aluminum alloy is 6061-T6 or 5454-H32, which are standard, commercially available alloys. However, the use of an aluminum alloy in present front loader body designs is not entirely satisfactory.

In order to withstand the high pressures generated inside the front loader body, a plurality of braces are typically disposed along the roof, floor and sidewalls of the front loader body. These braces are welded onto the body. Unfortunately, the heat generated in the welding process adversely affects the strength of the aluminum alloy. Excessive welding along the surface of an aluminum alloy will drastically reduce the strength of the alloy. The weakened alloy will be unable to withstand the pressure inside the front loader body making the alloy unfit for use in a front loader.

The addition of braces to the roof, floor and sidewalls of a front loader to increase strength will also increase the front loader's weight. This added weight limits the weight, and therefore the volume, of refuse that legally can be carried in the unit. As a result, the heavier front loader will reach the weight limitation sooner than a lighter front loader and must travel to and from a dump site more frequently than a lighter front loader.

One well-known means of increasing the strength of the roof, floor and sidewalls of a front loader without the use of braces is to make these surfaces curved. The use of curved surfaces for a container to impart strength to the container without the addition of races to these surfaces is conventional. For example, U.S. Pat. Nos. 3,339,499; 3,490,387; 3,427,994 and 3,495,548 all disclose railroad hopper cars having curved sidewalls and a curved roof.

However, merely using a curved surface is not entirely satisfactory for the hopper section of a front loader. To withstand the pressure imposed by the refuse, the surfaces of the body should be curved to a high degree, i.e., these surfaces should have a small radius of curvature. If a surface having a high degree of curvature is used for the sidewalls in the hopper section of the front loader and these sidewalls are spaced to maintain an adequate hopper opening, the sidewalls will interfere with the free rotation of conventional loading arms. Also, if a surface having a high degree of curvature is used for the sidewalls in the hopper section of the front loader and the sidewalls are spaced to maintain adequate loading arm clearance, the sidewalls will create a narrow hopper opening. This narrow opening will not allow garbage containers having standard opening to be freely dumped into the front loader. Moreover, if the degree of curvature is too small, without additional bracing, the sidewalls will be unable to withstand the internal pressure caused by the packed refuse and will fail.

SUMMARY OF THE INVENTION

In light of the foregoing, a general object of the invention is to provide a front loader body having sidewalls in the hopper section which are oriented to achieve the greatest degree of curvature without interfering with the operation of the loading arms and without unduly restricting the size of the opening at the top of the hopper section.

Another object of the invention is to provide a front loader body that has fewer parts, requires fewer welds during assembly and therefore is easier to manufacture and is less costly.

Yet another object of the invention is to provide a front loader body that is both strong and lightweight.

Still another object of the invention is to provide a front loader body where the hopper sidewalls can be made out of lightweight material such as an aluminum alloy.

A front loader, according to one embodiment of the present invention intended to meet the foregoing objectives, employs sidewalls on the hopper section of the body that are curved and that are not symmetrical about a horizontal axis.

Other objects and advantages of the invention will become apparent with reference to the drawings and the detailed description to follow.

DESCRIPTION OF THE DRAWINGS

The preferred embodiments are illustrated in the appended drawings in which like reference numerals refer to like elements and in which:

FIG. 1 shows a perspective view of a preferred embodiment of the invention, showing the loading arms raised and the truck upon which the body is mounted;

FIG. 3 is a partial cross sectional view of the front section of the body of a preferred embodiment of the invention taken along lines 3—3 of FIG. 2;

FIG. 5 is a partial cross sectional view of the front section of the body of yet another alternative embodiment of the invention; and FIG. 6 is a partial cross sectional view of the front section of the body of still another alternative embodiment of the invention.

DETAILED DESCRIPTION OF THE INVENTION

Figure 2:
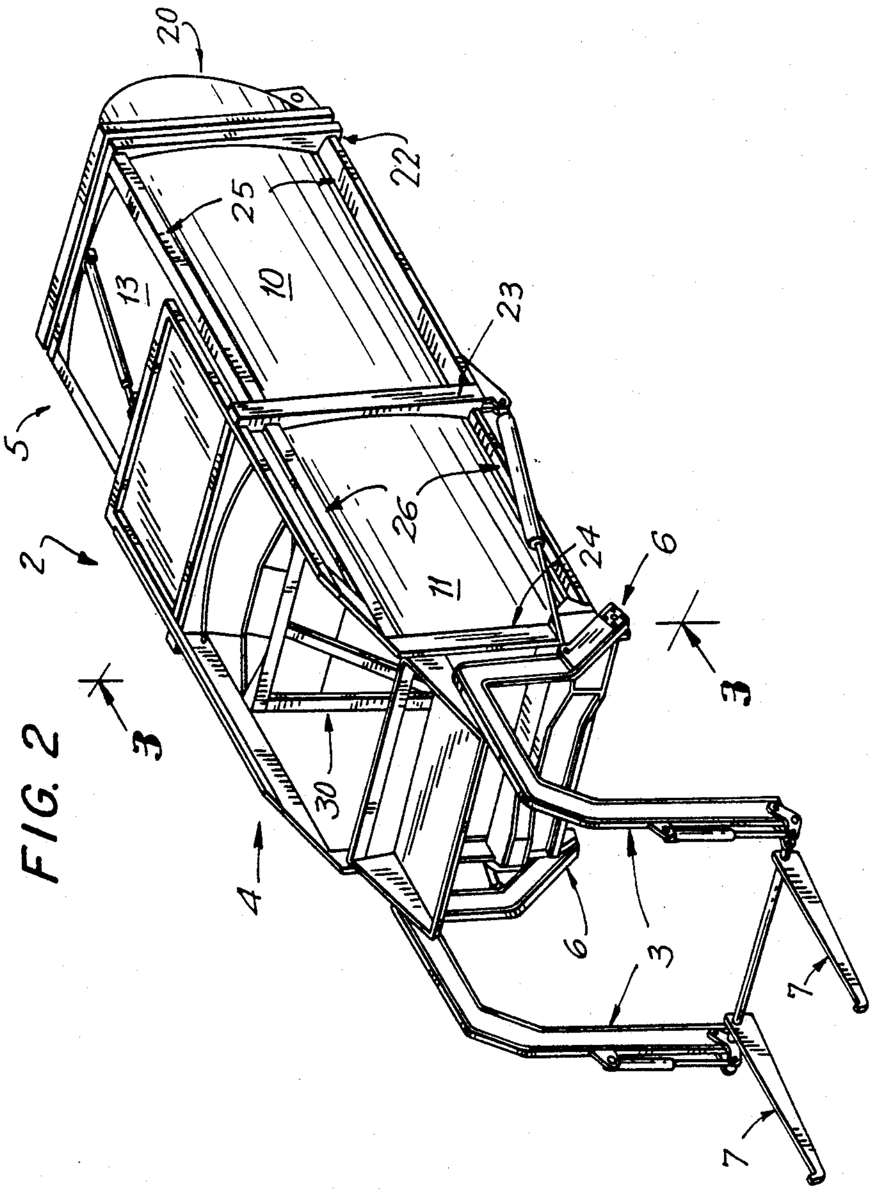
FIG. 2 is a perspective view of a preferred embodiment of the invention with the loading arms lowered.

Referring now generally to the drawings but in particular to FIG. 1, FIG. 2 and FIG. 3, front loader body 2 is comprised of front section 4 and rear section 5. Front section 4 comprises the hopper which receives the refuse from garbage containers. Rear section 5 comprises the storage area into which refuse is compacted.

The hopper has an open top. This allows refuse to be deposited into the hopper through the top opening of front section 4. The hopper also has packer panel 30 located inside. The packer panel 30 is guided by tracks 14. Packer panel 30 pushes refuse from the hopper and packs it into the storage area. This allows more refuse to be deposited into the hopper without causing refuse to overflow the hopper and fall onto the street.

Loading arms 3 are pivotally connected on either side of front section 4. Loading arms 3 rotate about pivot points 6 (see FIG. 2). Forks 7 are located on the forward end of loading arms 3. When loading arms 3 are in their down position, forks 7 engage garbage containers filled with refuse. Loading arms 3 are then raised. This positions the garbage containers over the opening in front section 4. Forks 7 then tip the garbage containers to empty the refuse from these containers into the hopper. After refuse has been emptied from the garbage containers, forks 7 rotate the containers to an upright position and loading arms 3 are then lowered to place the garbage containers back on the ground.

After the storage area is packed full and front loader body 2 is taken to a dump site, refuse is ejected through an opening (not shown) at the rear of the unit. Door 20, which can be curved or flat or any other configuration to enclose the opening at the rear of rear section 5, is pivotally connected at the rear of rear section 5. In this way, door 20 can be pivoted to expose the opening. Refuse is then ejected through this opening.

Refuse is ejected with the aid of gravity. Front loader body 2 is raised at front section 4 via hydraulic cylinders (not shown). In this way, the refuse will slide out of the opening in rear section 5 due to the force of gravity. Packer panel 30 can also be used to push the refuse through a portion of the length of body 2. This force will assist gravity in moving refuse out of body 2.

Front loader body 2 has a rear frame 22, which is comprised of two horizontal braces and two vertical braces. Middle frame 23 separates front section 4 from rear section 5. Middle frame 23 is comprised of two vertical braces and one horizontal brace along roof 13. Forward frame 24 is comprised of two horizontal braces and two vertical braces. Longitudinal braces 25 connect middle frame 23 to rear frame 22. Longitudinal braces 26 connect middle frame 23 to forward frame 24. Longitudinal braces 25 and 26 are located on both sides of body 2.

Front loader body 2 is enclosed by roof 13, which covers only rear section 5, sidewalls 10 and 11, which are located on both sides of body 2, front floor **12*a*, rear floor 12*b*, door 20 and packer panel 30**.

Sidewalls 11 are curved and sidewalls 10 can be flat or curved. In addition, sidewalls 11 are not symmetrical about a horizontal axis. In the preferred embodiment of the invention, sidewalls 10 are curved with a radius of curvature of about 227 $\frac{3}{4}$ inches. The radius of curvature of sidewalls 11 is about 180 $\frac{1}{2}$ inches.

Figure 4:
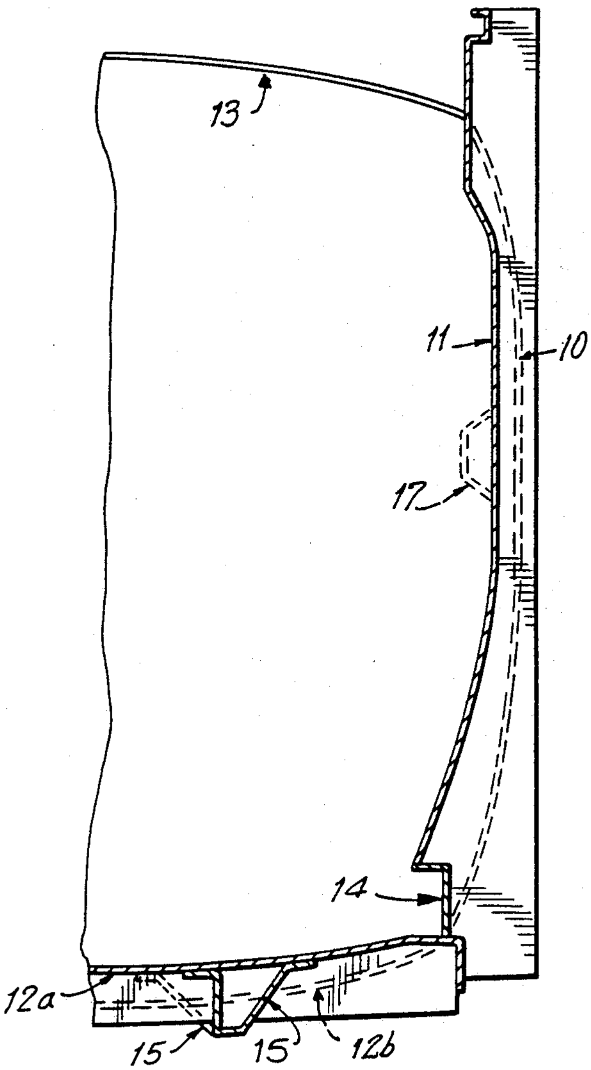
FIG. 4 is a partial cross sectional view of the front section of the body of an alternative embodiment of the invention.

Sidewalls 11 are oriented so that the axis of symmetry S directed toward the center of the hopper is rotated above a horizontal line H. The preferred embodiment of the invention has sidewalls 11 oriented so that the axis of symmetry S directed toward the center of the hopper is rotated about 2.8° above the horizontal H. It is understood that this description applies to both sides of front loader body 2 and that FIG. 3, as well as FIGS. 4, 5 and 6, show only one half of the cross section of front loader body 2 with the half not shown being a mirror image of the half that is shown.

This arrangement allows sidewalls 11 to be sufficiently curved to withstand the pressures inside the hopper but not interfere with the operation of loading arms 3 or restrict the opening in the top of front section 4. By so configuring and orienting sidewalls 11, the hopper section of body 2 will be able to withstand the pressures exerted by refuse without the need for a plurality of braces, while still providing clearance for loading arms 3.

Front floor **12*a* and rear floor 12*b* may be curved or flat. In the preferred embodiment, front floor 12*a* and rear floor 12*b* are curved. Front floor 12*a* has a larger radius of curvature than rear floor 12*b*. The radius of curvature for front floor 12*a* is about 195 $\frac{1}{2}$ inches. The radius of curvature for rear floor 12*b* is about 137 3/16 inches. The radius of curvature can also be the same for both front floor 12*a* and rear floor 12*b*. Braces 15 provide added strength and are divided into two parts, one for front floor 12*a* and one for rear floor 12*b***.

By providing front floor **12*a* with a larger radius of curvature than the radius of curvature of rear floor 12*b* and by providing a smaller radius of curvature for sidewalls 11 than the radius of curvature for sidewalls 10, a lip is formed between rear section 5 and front section 4**. This lip hinders the ability of refuse to flow back into the hopper once it has been packed into the storage area.

Roof 13 can also be curved thereby eliminating the need for braces thereon. In the preferred embodiment, roof 13 has a radius of curvature of about 137 3/16 inches.

Since braces are eliminated from roof 13 and sidewalls 10 and 11, the number of welds needed to fabricate roof 13 and sidewalls 10 and 11 is greatly diminished. Sidewalls 10 and 11 are welded along their edges where they are connected to frames 22, 23 and 24 and to longitudinal braces 25 and 26 connecting frames 22, 23 and 24. Front floor **12*a* and rear floor 12*b* are welded to braces 15, to the lower longitudinal braces 25 and 26, and frames 22, 23 and 24**.

By decreasing the number of welds needed to fabricate roof 13, front floor **12*a*, rear floor 12*b* and sidewalls 10 and 11, front loader body 2 can be made from a commercially available high strength aluminum alloy such as 6061-T6 or 5454-H32. 6061-T6 aluminum alloy typically has an ultimate strength of about 42,000 psi and a yield strength of about 37,000 psi. 5454-H32 aluminum alloy typically has an ultimate strength of about 40,000 psi and a yield strength of about 30,000 psi. This high strength aluminum alloy loses some of its strength due to the heat of welding. Thus by limiting the number of welds to roof 13, front floor 12*a*, rear floor 12*b* and sidewalls 10 and 11, the strength of roof 13, front floor 12*a*, rear floor 12*b* and sidewalls 10 and 11 is not significantly affected. Therefore, roof 13, front floor 12*a*, rear floor 12*b*, and sidewalls 10 and 11 still will be able to resist the pressure of refuse packed inside body 2. Of course this invention can be manufactured with other materials such as steel sheets instead of with aluminum. In addition, aluminum can be used either in only front section 4 or only in rear section 5**.

FIG. 4 shows another embodiment of this invention. This embodiment employs sidewalls 11 for front section 4 that have a flat midsection with curved upper and lower surfaces. An internal longitudinal brace 17 may be used along the inside of the flat midsection to strengthen sidewalls 11. This figure also shows the lip created between front section 4 and rear section 5 by using this embodiment.

FIG. 5 shows yet another embodiment of this invention. This embodiment employs sidewalls 11 having a double radius. Longitudinal brace 18 may be used at the point where the two curved portions meet. Longitudinal brace 18 imparts added strength to sidewalls 11. This figure also shows the lip created between front section 4 and rear section 5 by using this embodiment.

FIG. 6 shows still another embodiment of this invention. This embodiment employs sidewalls 11 that are curved along their lower portion and flat along the remainder. This figure also shows the lip created between front section 4 and rear section 5 by using this embodiment.

Each of these embodiments achieves the desired goal of reducing or eliminating the number of braces needed on sidewalls 11 of front section 4 to lighten front loader body 2, without unduly constricting the opening in the top of front section 4 leading to the hopper, and without interfering with the operation of loading arms 3. In addition, these embodiments allow aluminum alloy to be used on the hopper section without a significant reduction in the strength of sidewalls 11.

What is claimed is:

1. A front loading refuse collection apparatus having a body with a rear section for storing refuse and a front section for receiving refuse, (a) said rear section having a curved roof, a curved floor and curved sidewalls, (b) said front section having a curved floor;

(c) said front section having curved sidewalls of a different radius of curvature than the radius of curvature of said curved sidewalls of said rear section; and wherein (d) said curved sidewalls of said front section are not symmetrical about a horizontal axis.

2. The front loading refuse collection apparatus of claim 1 wherein said curved sidewalls of said front section have a smaller radius of curvature than said curved sidewalls of said rear section.

3. The front loading refuse collection apparatus of claim 2 wherein said front section sidewalls have a radius of curvature of about 180 ½ inches and said rear section sidewalls have a radius of curvature of about 227 ¾ inches.

4. The front loading refuse collection apparatus of claim 1 wherein said curved floor and curved sidewalls of said front section and said curved floor, said curved roof and said curved sidewalls of said rear section are made from a high strength aluminum alloy.

5. The front loading refuse collection apparatus of claim 1 wherein said curved sidewalls of said front section are oriented so that said curved sidewalls' axes of symmetry directed toward the inside of said body are about 2.8 degrees above the horizontal.

6. The front loading refuse collection apparatus of claim 5 wherein said curved sidewalls of said front section have a smaller radius of curvature than said curved sidewalls of said rear section.

7. The front loading refuse collection apparatus of claim 6 wherein said curved sidewalls of said front section have a radius of curvature of about 180 ½ inches and said sidewalls of said rear section have a radius of curvature of about 227 ¾ inches.

8. A front loading refuse collection apparatus having a body with a rear section for storing refuse and a front section for receiving refuse, (a) said rear section having a roof, a floor and sidewalls, (b) said front section having a floor, sidewalls and a member interconnecting said front section floor and each of said front section sidewalls wherein each of said front section sidewalls has a flat midsection and a curved upper and lower section and is oriented such that a line directed toward the inside of said body and perpendicular to a line defined by the top of said front section sidewall and the point where said front section sidewall interconnects said member is rotated above the horizontal.

9. The front loading refuse collection apparatus of claim 8 wherein said flat midsection has a longitudinal internal brace.

10. The front loading refuse collection apparatus of claim 8 wherein said curved floor of said curved front section has a larger radius of curvature than said curved floor of said rear section.

11. The front loading refuse collection apparatus of claim 8 wherein said floor and said sidewalls of said front section and said floor, said roof and said sidewalls of said rear section are made from a high strength aluminum alloy.

12. A front loading refuse collection apparatus having a body with a rear section for storing refuse and a front section for receiving refuse, (a) said rear section having a roof, a floor and sidewalls, (b) said front section having a floor, sidewalls and a member interconnecting said front section floor and each of said front section sidewalls wherein each of said front section sidewalls has a double curve along its length and is oriented such that a line directed toward the inside of said body and perpendicular to a line defined by the top of said front section sidewall and the point where said front section sidewall interconnects said member is rotated above the horizontal.

13. The front loading refuse collection apparatus of claim 12 wherein said sidewalls have an external longitudinal brace along said sidewalls between said double curve.

14. The front loading refuse collection apparatus of claim 12 wherein said floor and said sidewalls of said front section and said floor, said roof and said sidewalls of said rear section are made from a high strength aluminum alloy.

15. The front loading refuse collection apparatus of claim 12 wherein said curved floor of said curved front section has a larger radius of curvature than said curved floor of said rear section.

16. A front loading refuse collection apparatus having a body with a rear section for storing refuse and a front section for receiving refuse, (a) said rear section having a roof, a floor and sidewalls, (b) said front section having a floor, sidewalls and a member interconnecting said front section floor and each of said front section sidewalls wherein each of— said front section sidewalls is curved along its lower length and is flat along its upper length and is oriented such that a line directed toward the inside of said body and perpendicular to a line defined by the top of said front section sidewall and the point where said front section sidewall interconnects said member is rotated above the horizontal.

17. The front loading refuse collection apparatus of claim 16 wherein said curved floor of said curved front section has a larger radius of curvature than said curved floor of said rear section.

18. The front loading refuse collection apparatus of claim 16 wherein said floor and said sidewalls of said front section and said floor, said roof and said sidewalls of said rear section are made from a high strength aluminum alloy.

19. A front loading refuse collection apparatus having a body with a rear section for storing refuse and a front section for receiving refuse, said front section having a floor, curved sidewalls and a member interconnecting said front section floor and each of said front section sidewalls, said rear section having a floor, a roof and sidewalls and wherein each of said curved sidewalls of said front section is oriented such that a line directed toward the inside of said body and perpendicular to a line defined by the top of said front section sidewall and the point where said front section sidewall interconnects said member is rotated above the horizontal.

20. The front loading refuse collection apparatus of claim 19 where said curved sidewalls of said front section are oriented so that said curved sidewalls' axes of symmetry directed toward the inside of said body are about 2.8 degrees above the horizontal.

21. The front loading refuse collection apparatus of claim 19 wherein said rear section has curved sidewalls and said curved sidewalls of said front section have a smaller radius of curvature than said curved sidewalls of said rear section.

22. The front loading refuse collection apparatus of claim 19 wherein said front section sidewalls have a radius of curvature of about 180 ½ inches and said rear section sidewalls have a radius of curvature of about 227 ¾ inches.

23. The front loading refuse collection apparatus of claim 19 wherein said curved sidewalls are made from a high strength aluminum alloy.

24. The front loading refuse collection apparatus of claim 19 wherein said floor of said front section is curved, said floor of said rear section is curved and wherein said curved floor of said front section has a larger radius of curvature than the radius of curvature of said curved floor of said rear section.

25. The front loading refuse collection apparatus of claim 24 wherein said curved floor of said front section has a radius of curvature of about 195 ½ inches and said curved floor of said rear section has a radius of curvature of about 137 3/16 inches.

26. The front loading refuse collection apparatus of claim 1 wherein said curved floor of said front section has a larger radius of curvature than said curved floor of said rear section.

27. A front loading refuse collection apparatus having a body with a rear section for storing refuse and a front section for receiving refuse, (a) said rear section having a roof, sidewalls and a curved floor, and (b) said front section having a curved floor with a larger radius of curvature than said curved floor of said rear section and sidewalls that have a flat midsection and a curved upper and lower section.

28. A front loading refuse collection apparatus having a body with a rear section for storing refuse and a front section for receiving refuse, (a) said rear section having a roof, sidewalls and a curved floor, and (b) said front section having a curved floor with a larger radius of curvature than said curved floor of said rear section and sidewalls that have a double curve along their length.

29. The front loading refuse collection apparatus having a body with a rear section for storing refuse and a front section for receiving refuse, (a) said rear section having a roof, sidewalls and a curved floor, and (b) said front section having a curved floor with a larger radius of curvature than said curved floor of said rear section and sidewalls that are curved along their lower length and are flat along their upper length.

* * * * *

UNITED STATES PATENT AND TRADEMARK OFFICE
CERTIFICATE OF CORRECTION

PATENT NO. : 4,909,564

DATED : March 20, 1990

INVENTOR(S) : Thomas E. Pfeifer and Larry D. Horning

It is certified that error appears in the above-identified patent and that said Letters Patent is hereby corrected as shown below:

Abstract, line 5, "hooper" should be -- hopper --.

Column 2, line 29, "races" should be -- braces --.

Column 2, line 50, "opening" should be -- openings --.

Column 8, line 55, "The" should be -- A --.

Signed and Sealed this

Twenty-third Day of April, 1991

Attest:

HARRY F. MANBECK, JR.

*Attesting Officer*

*Commissioner of Patents and Trademarks*